United States Patent [19]

Malmqvist et al.

[11] Patent Number: 4,587,847

[45] Date of Patent: May 13, 1986

[54] METHOD FOR INDICATING CONCEALED DEPOSITS

[75] Inventors: Erik L. Malmqvist, Båstad; Krister Kristiansson, Lund, both of Sweden

[73] Assignee: Boliden Aktiebolag, Stockholm, Sweden

[21] Appl. No.: 509,448

[22] PCT Filed: Sep. 30, 1982

[86] PCT No.: PCT/SE82/00306

§ 371 Date: May 23, 1983

§ 102(e) Date: May 23, 1983

[87] PCT Pub. No.: WO83/01309

PCT Pub. Date: Apr. 14, 1983

[30] Foreign Application Priority Data

Oct. 7, 1981 [SE] Sweden .............................. 8105923

[51] Int. Cl.⁴ .......................................... G01N 33/24
[52] U.S. Cl. .................................. 73/432 R; 436/25; 436/26
[58] Field of Search ...................... 73/432 R, 28, 155, 863.21-863.25; 436/25, 26, 28, 29

[56] References Cited

U.S. PATENT DOCUMENTS

| | | | |
|---|---|---|---|
| 2,266,556 | 12/1941 | Kelly | 436/29 |
| 2,284,147 | 5/1942 | Herrick | 436/29 |
| 2,307,602 | 1/1943 | Penney et al. | 73/863.21 |
| 2,345,219 | 3/1944 | Sanderson | 436/29 |
| 2,465,564 | 3/1949 | Abrams | 23/230 |
| 2,479,787 | 8/1949 | Stevens | 436/29 X |
| 2,691,109 | 10/1954 | Bernard | 250/83 |
| 3,180,983 | 4/1965 | Hall, Jr. et al. | 436/29 X |
| 3,490,288 | 1/1970 | Patnode | 73/863.23 |
| 3,665,194 | 5/1972 | Alter et al. | |
| 3,763,428 | 10/1973 | Preist | 73/28 X |
| 3,862,576 | 1/1975 | Pogorski | 436/29 X |
| 3,943,750 | 3/1976 | McLaughlin | 73/432 R X |
| 3,987,677 | 10/1976 | Alter | 73/432 R X |
| 4,017,731 | 4/1977 | Howell et al. | 250/253 |
| 4,041,768 | 8/1977 | Gilbert et al. | 73/28 |
| 4,065,972 | 1/1978 | Holub et al. | 73/432 PS X |
| 4,186,303 | 1/1980 | Smith et al. | 250/253 |
| 4,426,575 | 1/1984 | Malmqvist et al. | |
| 4,468,558 | 8/1984 | Malmqvist et al. | |

FOREIGN PATENT DOCUMENTS

| | | | |
|---|---|---|---|
| 1076267 | 4/1980 | Canada | 73/432 R |
| 373990 | 4/1923 | Fed. Rep. of Germany | 436/29 |
| 2601926 | 8/1976 | Fed. Rep. of Germany | 436/28 |
| 2227541 | 11/1974 | France | 436/26 |
| 91449 | 6/1982 | Japan | 73/28 |
| 308955 | 3/1969 | Sweden | 73/432 R |
| 112282 | 1/1941 | United Kingdom | 436/25 |
| 1018658 | 1/1966 | United Kingdom | 73/432 R |

OTHER PUBLICATIONS

A New Model Mechanism for the Transportation of Radon Through the Ground-K. Kristiansson and L. Malmqvist, presented at the Society of Exploration Geophysicists Fiftieth Annual International Meeting Nov. 16-20, 1980, Houston, Tex., 25 pages.
"Use of 'Molecular Sieves' as Gas Samplers"; *Chemistry & Industry;* Jan. 1959; pp. 155-156; B. L. Tonge et al.
"Ion-Exchange Separation and Atomic-Absorption Determination of Fifteen Major, Minor, & Trace Elements in Silicates"*Short Communications;* No. 11-12, pp. 879-882, Dec. 1976; Ambrogio Mazzucotelli et al.
"Calibration of Diffusion Sampler Used for the Measurement of Unattached Radon Daughter Product"; Atmospheric Environment; vol. 14, No. 1; Jan. 1980; pp. 145-147; M. C. Subba Remu.

*Primary Examiner*—Stewart J. Levy
*Assistant Examiner*—Tom Noland
*Attorney, Agent, or Firm*—Nils H. Ljungman

[57] ABSTRACT

The invention relates to a method for indicating the presence of concealed minerals and/or deposits in prospecting or exploration operations. A flow of ascending free geogas is analyzed with respect to its content of entrained substances of exploration interest. The gas is suitably sampled at locations beneath or above the surface of the ground, and its content of carried substances caused to be released, and then collected and analyzed. The gas may suitably be caused to flow through a device in which solid substances of interest are collected for example by absorbtion and/or adsorbtion techniques. Electrically charged particles can also be collected with the aid of an electric field.

23 Claims, 1 Drawing Figure

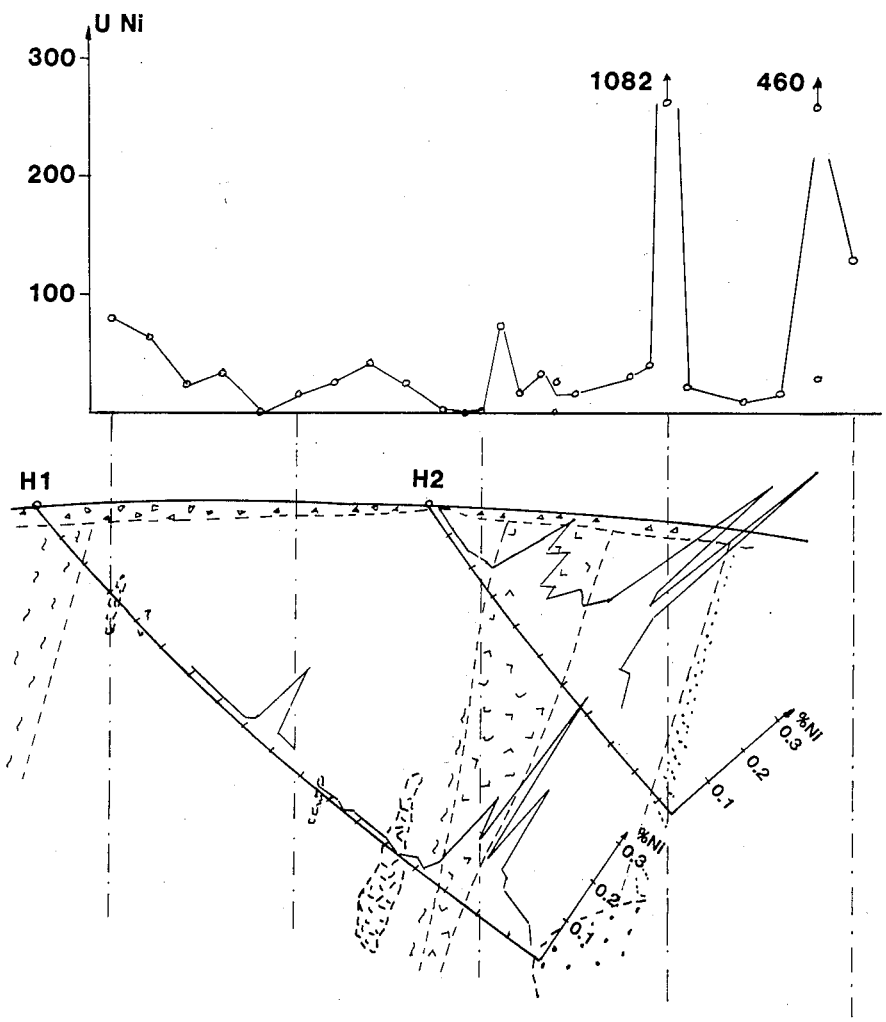

METHOD FOR INDICATING CONCEALED DEPOSITS

The present invention relates to a method of indicating deposits of ore, minerals, hydrocarbons or geothermal energy concealed beneath the surface of the ground. More particularly, the invention relates to a method for indicating deposits which do not exhibit those specific physical properties necessary when using geophysical prospecting or exploration methods known hitherto or as a complement to traditional exploration techniques.

Several methods for detecting deposits of, for example, ores, minerals, hydrocarbons, geothermal energy etc. concealed beneath the surface of the ground are known to the art. All known prospecting or exploration methods, however, rely upon the deposit having a property which is different to the general surroundings and which can be measured from above the ground surface. By way of example can be mentioned differences in density, which give rise to variations in the gravity field and differences in magnetic field strength. Some deposits release or generate traces of gas, which may be collected and analyzed. Once having found the deposit it is necessary to make boreholes or sink a shaft, partly to verify the exploration result and partly to establish the magnitude of the deposit, its composition and the quantities in which the substances incorporated in the deposit are present therein.

There are proposed exploration methods for detecting underground minerals, which methods are based on the determination of radon gas migrating to the ground surface. Such methods may be utilized for finding uranium ore deposits from which the radon gas originates, since radon is one of the decay products in the radioactive uranium series. Exploration methods utilizing radon determination and gas sampling methods related thereto are described in CA-A No. 1076 267, SE-B No. 308 955, SE-B No. 336 688, SE-A No. 8007338-0, U.S. Pat. No. 4 017 731 and U.S. Pat. No. 4 186 303.

It is further proposed to collect gas samples from gases migrating from other underground deposits, such as oil, coal, water and also inorganic minerals containing mercury, which deposits give rise to gaseous emanations of a nature which may be identified and related to the source. For example U.S. Pat. No. 3 987 677 discloses collecting gas samples in water covered areas, and U.S. Pat. No. 4 065 972 discloses collecting gas samples in a plurality of containers planted in shallow holes in the earth surface. It is also proposed to use similar techniques for logging bore-holes in the search for petroleum bearing formations. Such methods are disclosed in the U.S. Pat. Nos. 2 465 564 and 2 691 109.

Although some exploration methods based on sampling gases whose origin are in deep deposits of minerals, especially uranium, are proposed, these methods have not been put to extensive use for other elements. One reason is that the sampling techniques used do not yield accurate information relating to the concentration of such gases. As a result, exploration activities directed to locating promising underground oil, gas, and other minerals have concentrated on other techniques, such as seismic surveying with acoustic waves, electrical and nuclear well logging, test drilling and the like. While such efforts have yielded useful results in the past, the growing scarcity of rich deposits and the increasing expense of conducting such exploratory activities have rendered these techniques relatively undesirable.

Thus, prospecting or exploration techniques still lack a method in which the existence of and the composition of, for example, mineralizations in the ground can be discovered without requiring test bore holes or a shaft to be sunk.

It has now been surprisingly found possible to provide a prospecting or exploration method based on observations of a new physical-geophysical phenomenon and on the sampling and analysis of gas ascending through the ground and of the matter brought to the surface by that gas flow. It is possible in accordance with the invention to discover from trace substances accompanying the gas the presence of deposits of the aforementioned kind lying beneath the surface of the ground, and even at great depths therebeneath. It is also possible in this way to determine the type of deposit and its possible magnitude. The method according to the invention is based on the characteristics set forth in the following claims, and is thus based on the occurrence of trace substances in upwardly flowing gas, and the collection, registration and analysis of the gas flowing from the ground and the accompanying substances to determine such substances of exploration interest.

Previous tests made by the inventors to determine how the concentration of radon-222 in the ground is related to the distance from the sampling location to the surface of the ground have shown that there exists a slow, ascending flow of free gas through the ground. This gas is referred to hereinafter as geogas or carrier gas. The gas flows substantially, vertically, and the greater part of the gas probably moves along passages present in the ground, a characteristic of these passages being that the resistance to gas flow therein is lower than that in the surrounding ground. Beneath the ground water level, the gas flows in the form of bubbles, which pass through the ground and rock in cracks and cavities located therein. The rate of flow of the gas close to the surface of the ground is particularly low. Gas flow rates of from 2–5 cm/day have been measured, using radon measuring methods, over ground of differing nature. The rate of gas flow is much higher at greater depths.

These mechanisms have been experimentally observed and analyzed in three papers, namely: "Evidence for Non-Diffusive Transport of $_{86}{}^{222}$Rn in the Ground and a New Physical Model for the transport" (Kristiansson & Malmqvist, *Geophysics* October-82 to be printed), "The Lithosphere—a Huge Natural Bubble Chamber" (Malmqvist & Kristiansson, Manuscript February-82) and "Experimental Evidence for an Ascending Microflow of Geogas in the Ground" (*Malmqvist & Kristiansson Manuscript February-82*). It is thought that the geogas is generated by a cyclic process. Rain water saturated with soluble gases perculates down to the ground water. Unconsumed gas is able to diffuse downwardly, because the solubility of the gas increases with increasing pressure. This continues until equilibrium is reached. Movements in the ground water, for example as a result of streaming, may cause the mass of ground water to move upwards to a region of lower pressure. This causes a state of oversaturation and the dissolved gas has got the potential to form a piece of free gas in the form of a bubble. Possible mechanism by which free gas bubbles can be created is the triggering effect of α-particles produced in the decays of the radioactive elements of uranium, thorium and their daughter products. The basis for this bubble creation mechanism resides in the fact that a liquid is surprisingly stable against spontaneous degassing, even if the system is oversaturated, and at the spot where the bubble is created, there must exist a nucleus for bubble formation or that such a nucleus must be produced in advance. Such a nucleus may be a large local energy loss of a charged particle passing through the oversaturated water. This is in many respects similar to theories of bubble formation in an ordinary bubble chamber known from high energy particle physics. Once the free gas bubble is created, it is forced upwards through its buoyancy and can thus ascend through cracks and fissures in the bedrock. It remains as a free gas bubble because it passes through ground water already saturated with dissolved gases. It is also possible that traces of gas molecules originating from the mantle and the crust can play a contributory role.

Microscopic quantities of material are released from existing concealed deposits, by chemical activation or by the statistically distributed movements constantly refound in materials when considered from the point of view of solid state physics. Material released in this way is adsorbed at the interface between the gas and the liquid and thus by the ascending gas flow and carried upwards through the ground. The flow of geogas consequently acts as a carrier gas. The released material may be in the form of ions, atoms or aggregates of atoms.

From experiments carried out by the inventors they have found out that the flowing geogas mainly consists of nitrogen, although it may also contain argon, oxygen, methane and heavier hydrocarbons in varying quantities. In addition, the gas may also bring minor quantities of trace elements from those regions in the earth crust through which the gas has passed, as indicated above. One example of this is radon-222, which accompanies the geogas from regions where radon gas is formed by decomposition of the radio active uranium series. It is reasonable to assume that the adsorption mechanism has the property of capturing different elements with different probabilities.

The fact that the upwardly flowing geogas can carry with it minor quantities of trace substances from the loose earth layer and the ground through which the geogas flows, means that the flowing geogas contains information about the geological conditions prevailing beneath the surface of the ground at the site at which the sampling was made. The information delivered by the geogas in the form of trace substances can be utilized to reveal the presence of valuable minerals or of other geological formations of economic interest. Consequently, the registration and analysis of the trace elements accompanying the ascending geogas flow constitute a prospecting or exploration method which is able to provide information relating to the presence of minerals and also to the depth at which they are located.

It will be obvious from the above, and with knowledge of the ascending geogas flow, that a considerable part of the released matter formed in, or given-off by certain deposits will be carried to the earth's surface by geogas passing through the deposits. It would also derive from this that the diffusion-based migration mechanisms of these gases have far less significance than was previously thought. Hence, those methods based on such migration mechanisms, in which methods samples of those gases set forth in the introduction are collected and analysed, must reasonably lead to results which are difficult to interpret. This is probably the main reason why it has not been possible hitherto to apply such prospecting methods on a wider scale.

Those sampling methods which predominate in prospecting methods based on gas sampling and analysis and mentioned in the introduction can only be applied with diffusing gases. For example, it is suggested in the literature that the sampling devices must be enclosed in such a way that a gasflow through the device is not permitted. This means, in effect, that gases rising from beneath cannot collect to any large extent in the devices, because of the internal resistance which they meet, but are instead deflected to one side, and pass outside the confines of said sampling devices.

Organic hydrocarbons present in the ascending geogas flow are able to indicate the presence of hydrocarbons in the ground. The use of gaseous or volatile trace substances in the stream of geogas for exploration purposes falls within the scope of the invention.

The mechanism by which the geogas is conveyed through rock and ground water is such as to enable separate atoms, ions, molecules and even extremely minute aggregates of solid substances to be conveyed to the surface with the geogas. The fact as to whether or not the various substances can be conveyed to the surface depends upon the specific surface properties of said substances, i.e. the extent to which these substances are able to bind to the surface of a bubble. Sampling and analysis of these microscopic quantities of material can provide information concerning the presence of different minerals and metals in the ground.

The techniques for sampling trace amount of substances carried by the geogas are different depending on whether the sampling is carried out above the ground-water level or not. As beforementioned the geogas flows in the form of bubbles beneath the ground-water level. On the surfaces of the bubbles are adsorbed traces of substances in the form of particle aggregates of differing sizes which are more or less bound to the surface of the bubbles. Consequently, the bubbles must first be caused to release such adsorbed particle aggregates, which are then collected and analyzed. At the ground-water level the adsorbed particles are released from the bubble as a result of natural causes, e.g. as a result of the bubble collapsing as it meets the earth layer defining the ground-water level. The released bubble surface energy throws the entrained particles out into the soil gas atmosphere above the ground-water level, where a geogas flow initiated by the former bubbles will carry the particles upwardly in a suspended state. The suspension of geogas and particles may be described as an aerosol. Consequently, the techniques for collecting geogas entrained or suspended particles above the ground-water level must involve guiding the geogas flow continuously through a device, in which particles entrained by the flow are separated from the gas and thus collected within the device. The device may be placed anywhere between the ground-water level and the surface of the ground. The device may even be placed on or above the ground surface, provided that the geogas flow can pass through the device without any atmosphere contact, so that the geogas is not mixed or diluted with air from atmosphere before the sampling operation.

The invention will now be described in more detail with particular respect to those methods which can be used when prospecting or exploring according to the invention for sampling, registering and measuring purposes.

The geogas can be sampled in a number of different ways, for example by placing a sampling device on the surface of the ground or by arranging said device at a suitable depth beneath the ground surface and even beneath the ground-water level in the region to be investigated. These devices may be provided with or connected to detectors, collectors or sensors placed beneath or above the ground, for the purpose of collecting and guiding the gas flow therethrough over a given period of time and thereby collecting entrained trace substances in said flow and measuring or analyzing the same. Sampling devices intended for measuring radon contents can be used to advantage. Such devices are described, for example in EP-A1-Nos. 0051054 and 0050605, respectively. When the sampling device is to be placed on the surface of the ground, the device itself may be provided with a detector for the substance or substances whose presence shall be investigated. When it is preferred to place the sampling device beneath the surface of the ground, the device may have the form of a two-chamber system with associated detectors, for the purpose of measuring the concentration of trace substances in the gas flow in relation to flow dynamic parameters. The gas collected in this way is passed through a hose up to ground level, for collecting and analysis of entrained substances and preferably also for determining velocity and rate of flow.

For sampling gas bubbles beneath the ground-water level, cup-shaped vessels of for example those types described in U.S. Pat. Nos. 3 987 677 and 4 065 972 may be utilized. As hereinbefore described the geogas bubbles must be caused to release their surface adsorbed content of entrapped particles to make it possible to collect the particles. By using a gas-tight sampling device such as above indicated an artificial "ground-water level" is generated within the device, because of the air enclosed. Thus, the adsorbed particles released from the bubbles at the artificial "ground-water level" are thrown into the enclosed space above the water level and are there caught or trapped in a suitable manner, for example by placing a suitable adsorbing or absorbing material inside the space. The geogas flow can be readily followed in this way and any interesting information therein be continuously registered.

When the particles or aggregates accompanying the geogas are of interest in the context prevailing at that time, these particles and aggregates can be sampled and concentrated in various ways. Trace substances accompanying the upwardly flowing geogas above ground-water level are as above indicated suitably sampled in a system of double containers interconnected by means of hoses. The lower container serves as collecting means for the geogas with accompanying trace substances. When geogas is introduced into the upper container through the connecting hose, the gas is permitted to pass through a device in which trace elements are separated from the flow and collected as the gas passes therethrough. For example, the trace substances can be collected by passing the gas through a pipe or a container provided with some absorbent and/or adsorbent substance, such as active carbon, silica gel, zeolites. It is also possible to guide the gas stream towards a membrane which adsorbs the particles. The upper container serves as protection for the collecting means. The substances which have been collected from the upwardly flowing geogas over a suitably long sampling period are analysed in laboratories with the aid of known chemical or physical analysis methods.

Devices for concentration and collecting minute particles from gas streams are known in connection with sampling particles present in the atmosphere. Concentrating and collecting techniques described, for example, in U.S. Pat. No. 3 868 222 may be utilized also for sampling geogas and concentrating and collecting particles entrained therewith.

Electrically charged particles in the gas are suitably collected by means of electric fields which are given such direction such as to attract charged particles. The gas may also be ionized, for example with a slightly radio-active substance, whereafter electric fields can be used to attract particles in greater volumes. In the case of substances which are particularly reactive, registration can be effected by utilizing respective reactions, such as the solubility of mercury in gold for example, as described in SE-B-Pat. No. 7205148-5. The substances entrained by the geogas can also be collected on a high-voltage electrode placed above ground surface.

Material in ion form accompanying the geogas can suitably be collected by permitting the gas flow to pass through an ion-exchanger, which is stripped for analysis after a suitable length of time has lapsed. The use of an ascending flow of gas for prospecting on exploration purposes also requires the measurements to be normalized in some way with respect to the rate of flow. The amount of material transported by the geogas depends partly on the at-source concentration of substances of interest and partly on the efficiency of the transporting mechanism. The efficiency of the transporting mechanism can depend on local dissimilarities in, for example, rock fissures, resulting in local dissimilarities in the rate of flow of the gas.

It is also within the scope of the invention to force the geogas flow to pass through the sampling device. The sampling device may advantageously be located in a borehole and thus the sampling may be facilitated by the draught action created by the hole itself. It is of course also possible to intensify the draught by means of chimney action or even by the presence of a fan or blower above the bore-hole.

The normalization and measurement of the extremely small gas flows pertinent in the present context is based on the principle of taking measurements at two locations. By determining the radon concentration at these two locations and by presuming the nature of the flow, it is possible to calculate the rate of flow, with the knowledge of the half-life of the radon. This enables the rate of gas flow to be measured in those situations where principles of kinetic energy transfer from the gas to the detector cannot be applied. The principle can be generalized to common situations in which the slow flow of small quantities of gas is to be measured. The radon source may comprise, for example, finely crushed minerals containing uranium. The theory and methodology of the transport mechanism and flow measurement is exhaustively described in a paper given by the inventors (Proc. Soc. Exploration Geophysicists 50th Annual Int. Meeting, Nov. 1980, Houston, USA). Another way for normalization which has been tested successfully is to use the information about the flow rate which is inherent in the observed amount of, for example, rock formating elements and other common elements. The surprising effects provided by the present invention has been tested in a number of experiments. In the example below the results from one site carried out by two different techniques will briefly illustrate this.

EXAMPLE

Above a concealed but shallow not outcropping small massive sulfide orebody known from a number of drillholes two different types of geogas traps were arranged. The target contains a relatively high grade of gold, silver and the base metals lead, zinc and copper.

In the first experiment the snow cover was used as a filter for catching associated metals to the geogas stream. Careful sampling and subsequent analysis of the snow by neutron activation revealed a good correlation between the gold-bearing ore and the content of gold in the snow.

In a second experiment the geogas was guided by a funnel-shaped device towards an about 140 Å thick membran at which associated trace atoms were caught. The device was placed at the frozen mineral soil below the snow cover and above a geological section containing a copper-nickel mineralization in an ultrabasic formation. Proton induced X-ray emission, PIXE, analysis of the membrans revealed the existence of characteristic base metals in a good correlation with the known deposit. This method of analysis unfortunately has a too high detection limit to detect the precious metals. The result is shown in the accompaying FIGURE, the lower part of which illustrates a vertical section of the mineralization. $H_1$ and $H_2$ denote two diamond-drilled boreholes from the ground through the mineralization. Analysis of Ni contents of the core from diamond drilling are illustrated in form of diagrams stating the nickel content in %. In the upper part of the FIGURE the corresponding PIXE analysis results of the test membranes with regard to Ni are given in arbitrary units. Similar results have been obtained also when analyzing copper and zinc.

The extent to which the invention can be applied will increase in line with more advanced analysis techniques. Those techniques available at present enable a heavy metal to be analysed in quantities down to between $10^{-10}$ and $10^{-14}$ g. In the case of the metals of the iron group, $10^{-14}$ g is roughly equivalent to $10^8$ atoms. It should lie within the limit of practical possibilities to produce a more sensitive analysis technique.

We claim:

1. A method for indicating the presence of concealed solid or liquid minerals or deposits, or both, in prospecting or exploration operations, characterized by directing a flow of ascending free geogas to a sampling device; separating and collecting any entrained solid or liquid substances including ions, atoms and aggregations of atoms; and analyzing the separated substances in order to determine the quantity of separated substances and identify solid or liquid minerals or deposits or both of explorational interest, on a basis of a transport mode of said substances being based substantially on said flow of said ascending free geogas.

2. A method according to claim 1 carried out at a location beneath the ground-water level, characterized by sampling the geogas flow in the form of bubbles and guiding the same to a device having a confined space, a bottom of which consists of a surface of water, and then collecting substances released from the gas bubbles at the water level.

3. A method according to claim 2, characterized by collecting said substances by adsorption techniques.

4. A method according to claim 2, characterized in that a bore hole is utilized for sampling the gas.

5. A method according to claim 2 characterized by collecting said substances by absorption techniques.

6. A method according to claim 1 carried out at a location above ground-water level, characterized by permitting or causing the geogas flow to penetrate the ground-water level, so that the entrained substances are released and suspended in a flow of free gas above said level, guiding said flow of free gas to flow over a given period of time through a confined space, which accomodates devices for collecting suspended substances.

7. A method according to claim 6, characterized by collecting said substances by adsorption techniques.

8. A method according to claim 6, characterized in that a bore hole is utilized for sampling the gas.

9. A method according to claim 6 characterized by collecting said substances by absorption techniques.

10. A method according to claim 1, characterized by collecting said substances by adsorption techniques.

11. A method according to claim 10, characterized by collecting any substances present in ionic form in accordance with an ion-exchange technique.

12. A method according to claim 11, characterized in that a bore hole is utilized for sampling the gas.

13. A method according to claim 10, characterized in a bore hole is utilized for sampling the gas.

14. A method according to claim 1, characterized by collecting electrically charged particles with the aid of an electric field having a direction such as to attract charged particles.

15. A method according to claim 14, characterized by ionizing the gas substances accompanying said gas prior to bringing the gas, and the accompanying substances, into contact with said electric field.

16. A method according to claim 15, characterized in that a bore hole is utilized for sampling the gas.

17. A method according to claim 14, characterized in that a bore hole is utilized for sampling the gas.

18. A method according to claim 1, characterized in that a bore hole is utilized for sampling the gas.

19. A method according to claim 1 characterized by collecting said substances by absorption techniques.

20. A method for indicating the presence of concealed solid or liquid minerals or deposits, or both, in prospecting or exploration operations, characterized by causing a flow of ascending free geogas to impinge upon a sampling device; separating and collecting any entrained solid or liquid substances including ions, atoms and aggregations of atoms; and analyzing the separated substances in order to determine the quantity of separated substances and identify solid or liquid minerals or deposits or both of explorational interest on a basis of a transport mode of said substances being based substantially on said flow of said ascending free geogas.

21. A method for indicating the presence of concealed solid or liquid minerals or deposits, or both, in prospecting or exploration operations, characterized by disposing a sampling device in a flow of ascending free geogas; separating and collecting any entrained solid or liquid substances including ions, atoms, and aggregations of atoms; and analyzing the separated substances in order to determine the quantity of separated substances and identify solid or liquid minerals or deposits, or both, of explorational interest on a basis of a transport mode of said substances being based substantially on said flow of said ascending free geogas.

22. A method according to claim 21 characterized by collecting said substances by adsorption techniques.

23. A method according to claim 21 characterized by collecting said substances by absorption techniques.

* * * * *